Nov. 26, 1968  J. W. SARGENT  3,413,604
STOCK QUOTATION DISPLAY DEVICE
Filed June 28, 1965  5 Sheets-Sheet 1

INVENTOR.
John W. Sargent
BY Arthur A. March
ATTORNEY

Nov. 26, 1968      J. W. SARGENT      3,413,604

STOCK QUOTATION DISPLAY DEVICE

Filed June 28, 1965      5 Sheets-Sheet 2

INVENTOR.
John W. Sargent
BY Arthur A. March
ATTORNEY

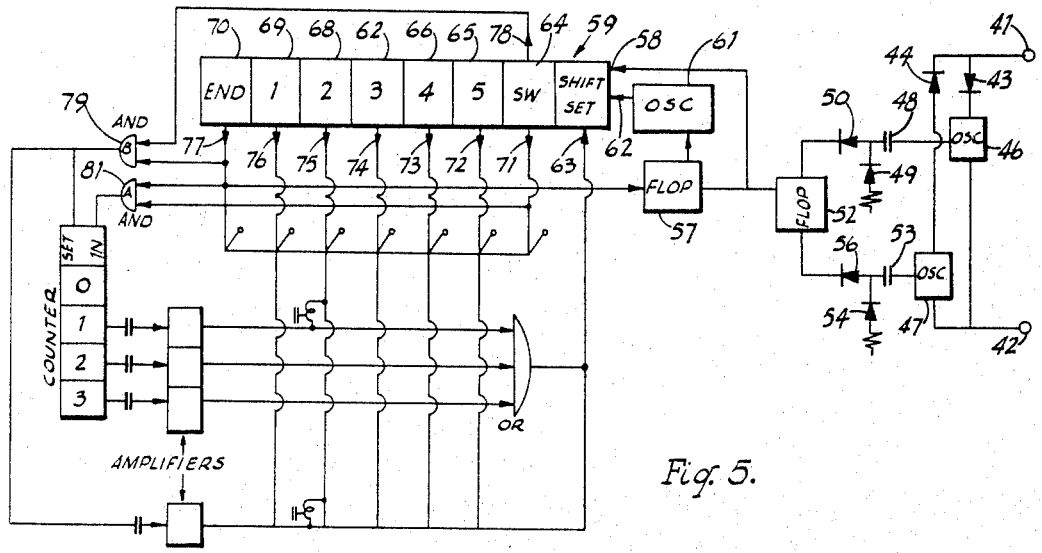
Fig. 5.
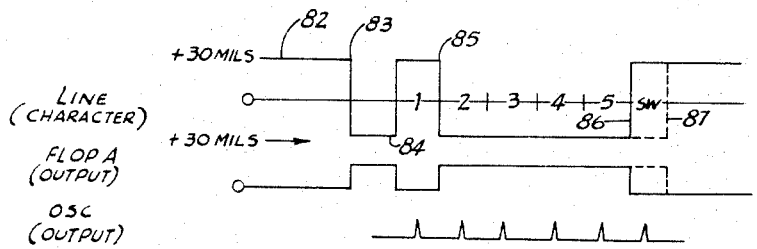
Fig. 6a.
Fig. 6b.
Fig. 6c.
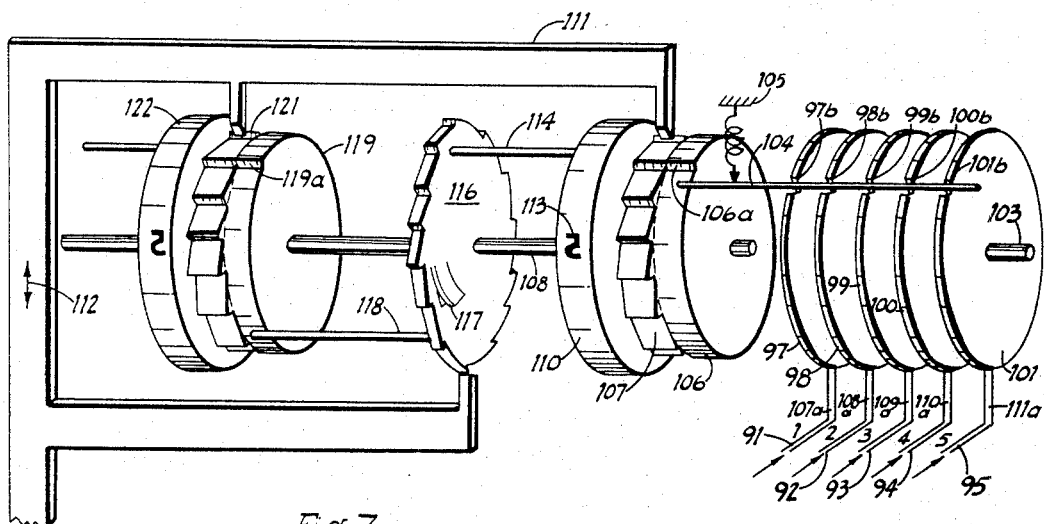
Fig. 7.
INVENTOR.
John W. Sargent
BY Arthur A. March
ATTORNEY Nov. 26, 1968   J. W. SARGENT   3,413,604
STOCK QUOTATION DISPLAY DEVICE
Filed June 28, 1965   5 Sheets-Sheet 4

INVENTOR.
John W. Sargent
BY Arthur A. March
ATTORNEY

INVENTOR.
John W. Sargent
BY
Arthur A. March
ATTORNEY

United States Patent Office 3,413,604
Patented Nov. 26, 1968

---

3,413,604
STOCK QUOTATION DISPLAY DEVICE
John W. Sargent, 20 S. 2nd Ave.,
Mount Vernon, N.Y. 10550
Filed June 28, 1965, Ser. No. 467,666
10 Claims. (Cl. 340—154)

This invention relates to an apparatus for displaying stock quotations based upon information received over a telegraph line. In particular, it relates to a pneumatic and electrical display device including a printer to print stock quotations on slips of paper or cards, a multi-position board having individual positions for individual stocks, a distributor means to control the printer in accordance with coded electrical signals, and means controlled by the distributor to transport the printed slips of paper or cards to the proper positions on the board.

Stock quotation display devices have usually presented stock prices either on tapes or on indicator boards. Information to be printed on tapes can be transmitted over a single telegraph channel and, once printed, is relatively permanent, although in actual practice only the most recently printed quotations may be displayed, and then only briefly. The display boards have complex and therefore expensive, decoding mechanisms along with complex, individual counters for each stock and are usually restricted to quoting the prices of only a relatively few stocks. The quotations are visible for much longer periods than in the case of tape displays, but once a new quotation is received, the previous one is lost completely. In addition, to tape and indicator boards, there are also dial display mechanisms, but the transmission problems in these systems are quite complex and the information is usually not permanently displayed.

The present invention combines some of the good features of both of the previously-mentioned displays. It is much cheaper and simpler than the display boards, having only one counter rather than individual ones for each stock; and the quotations remain in place longer than those on a moving tape.

The present invention is intended to be connected to a play board in accordance with identifying stock letters, and a printer operated from the same code signals prints numerical information on a card, or slip of paper, which is then pneumatically driven through channels set up by the decoder. Upon reaching the proper location on the display board, the card is trapped so that the numerical information thereon can be displayed through transparent window on the display board marked with the identifying letter symbol of that stock. The card stays in position single telegraph line to receive the same stock quotation code signals as the present-day tape display systems. A decoder within the apparatus sets up a multiposition disuntil a new one is printed for the same stock, whereupon the old one will be released and will be removed by air pressure as the new one is being brought into position.

It is one of the objects of the present invention to provide an improved stock quotation display device in which individual quotations are printed on quotation cards and are distributed pneumatically to display areas in a display board. The invention will be described in greater detail in connection with the drawings in which:

FIG. 5 is a block electrical diagram of one type of distributor for use in the invention;

FIGS. 6a–6c show waveforms characteristic of the operation of the circuit in FIG. 5;

FIG. 7 shows the mechanism for setting printing wheels to imprint the quotation cards.

Figure 1:
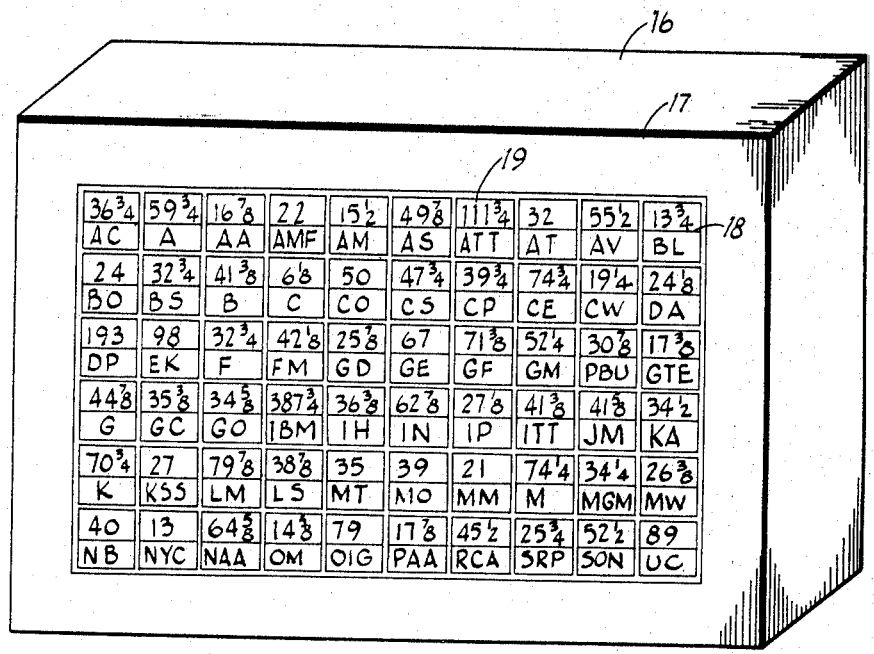
FIG. 1 is a perspective view of a display device for displaying stock quotation information on individual cards printed and distributed by mechanism constructed in accordance with the invention.

The display unit 16 shown in FIG. 1 has a front face 17 divided into a number of display areas 18 arranged in vertical columns and horizontal rows. Each display area is identified by letters designated an individual stock For example, the seventh area from the left on the top row has the symbol ATT for American Telephone and Telegraph. Above each of the letter designations is a quotation card 19 in which the latest price of the stock is printed. When a new quotation for any of designated stocks is received, a new quotation card is printed and the old quotation card is released to leave room for the new card to be received for display. If desired, the time at which the quotation was received can also be printed on the quotation card. Meanwhile the old quotation card is driven pneumatically out of the display device into a disposal area where it may simply be thrown away or, if desired, may be accumulated for later reference.

It is one of the features of the present invention that the individual display areas 18 may be changed at any time to receive quotations of different stocks. In addition, the quotation cards may have numerals of relatively large size in comparison to the total display area. Much larger than, for example, the relatively small numerals that must be used on the individual counters of present display boards. Thus, the present invention may be made compact enough to be placed on a broker's desk. While the display areas are shown in FIG. 1, arranged in alphabetical order, it is not necessary that they be so arranged. For example the top row might be devoted to certain very active stocks or to stocks in which the particular broker in whose office the display device was located was especially interested. Furthermore, it is not necessary that all of the display areas be set up to show quotations; some of them may be deliberately left blank without in any way disturbing the operation of the device.

Since there is no special relationship between any of the display areas and any particular stock, it is possible for a broker to install as many of the display devices 16 as he may see fit. Each of them could be set to operate off a single, common telegraph line so that there would be no extra cost for telegraph line rental. In this way, a large brokerage office could display every single stock on the New York Stock Excange and every single stock on the American Stock Exchange for the same telegraph line rental that it now costs him to feed the usual tape display devices for quotations from those two stock exchanges.

Figure 2:
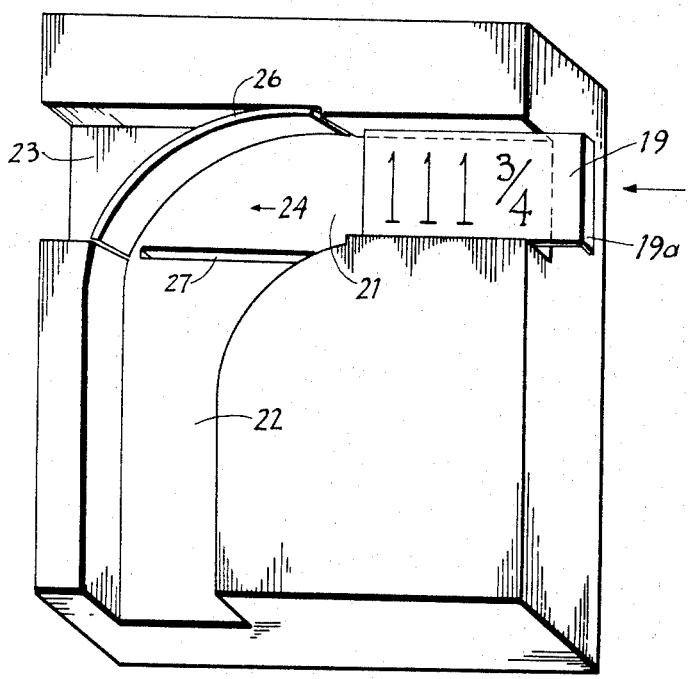
FIG. 2 shows a quotation card and a portion of a typical pneumatic channel within the display device of FIG. 1.

FIG. 2 shows one of the quotation cards 19 and a section of the distributing channels through which the cards pass to different groups of display areas 18, as shown in FIG. 1. These channels are indicated by reference numbers 21–23 and the quotation cards move through the channels in the direction indicated by the arrow 24. In the complete device the channels are enclosed by a top plate that has been removed to illustrate a typical interior construction. The channels have a depth and width sufficient to permit the quotation cards 19 to move freely therethrough without becoming stuck and the cards are preferably formed with a bent-over tab 19a at the back end to form a sail by which air pressure can drive the cards along. This air pressure may be produced by a vacuum pump at the output end of the device or, as is more common, it may be produced by a pump designed to force air into the channels in the direction indicated by the arrow 24, thereby pressing on the sail 19a and pushing the card 19 along.

Switching, or shunting, of the card 19 from the channel 21 to the channels 22 or 23 is accomplished by barriers, or gates, of which the gate 26 is shown in its raised position to divert the card 19 from the channel 21 into the channel 22. Another gate 27 is simultaneously retracted so as not to interfere with passage of the card, but if it is desired to drive the card 19 from the channel 21 into the channel 23, the gate 26 would be retracted and the gate 27 extended. The mechanism for operating these gates will be described hereinafter.

Figure 3:
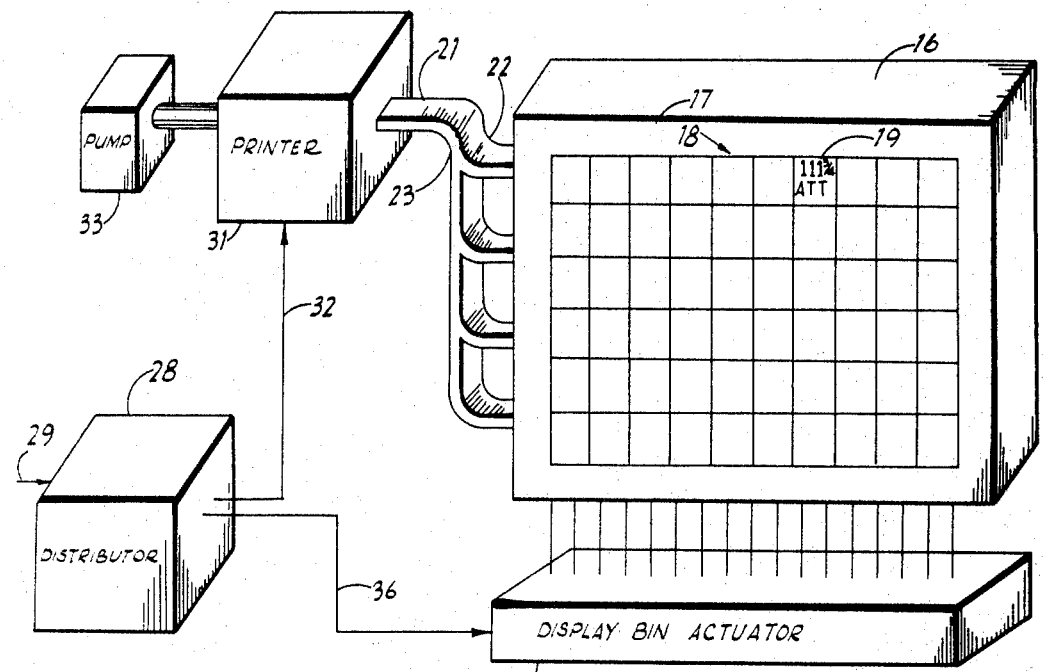
FIG. 3 is a schematic representation of the basic components of the invention.

The basic units for transforming telegraphic signals into quotation cards, dispersing the cards to the proper display areas, trapping them, and later releasing them to make room for a later quotation card are shown in FIG. 3. The units include a distributor 28 which is connected to a telegraph line 29 to receive code signals identifying the various stocks and their price quotations; a printer 31 connected by a line 32 to the distributor 28 to be controlled thereby to print the numerical price quotation on a quotation card 19; pneumatic means, including a pump 33 and conduits 21–23 and switching vanes, as shown in FIG. 2, for directing the printed quotation cards 19 to the display areas 18; means, not shown in FIG. 3 for opening the particular display area corresponding to the quotation just received so as to release the old quotation card in order to make room for the new one; and means 34 connected by a line 36 to the distributor 28 to actuate the mechanism at each of the individual display areas in accordance with information received on the telegraph line 29.

Figure 4:
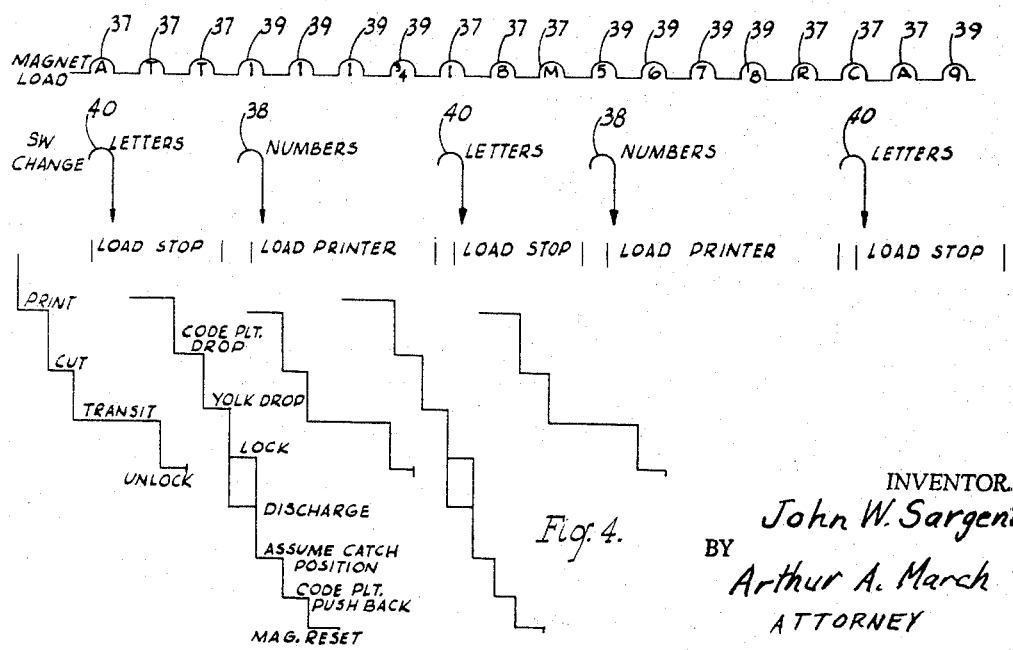
FIG. 4 is a timing diagram illustrating the relationship between components of the system.

FIG. 4 is a timing diagram for several quotations. In the first line the time intervals during which the individual symbols are transmitted are indicated as being equal, although it will have no effect if the symbols are not transmitted in equal intervals and it is normally to be expected that there would be a fairly extended time between the final digit of the quotation for one stock and the beginning letter of the next stock. Within the intervals indicated for each of the letters and numerals, code signals, which are not shown in this drawing, are transmitted from the telegraph line 29 to the distributor 28. After each letter symbol has been transmitted, instructions are transmitted over the line 36 to the control mechanism 34 in FIG. 3 during the intervals 37 in FIG. 4. The code signals include information as to whether a letter or a number is being transmitted, and when the letter signals are completed, a signal 38 is transmitted via the line 36 to open a particular display area 18 to release the quotation card 19, if any.

Thereafter the next signals received over the telegraph line 28 will be numerals. At the end of each numeral, during a time interval indicated by reference numeral 39, information will be transmitted via the line 32 to the printer 31 to set it to print the quotation numerals in order. After the quotation card 19 has been printed and a signal has been received to indicate the transition from numerals back to letters during the time interval 40, the distributor will again actuate the control mechanism 34 by way of the line 36 to open a new display area for the next stock quotation. The next quotation may, in fact, be for the same stock as the immediately preceding quotation, or it may be for a different stock for which a different display area 18 has been set aside, or it may be a stock for which no display area is set aside. In the latter case, the quotation may still be printed when the time comes to actuate the printer 31, but the quotation slip will simply be carried completely out of the display device 16 to a disposal container.

The electrical circuit of the distributor, or decoder, is shown primarily in block diagram form in FIG. 5. The input terminals 41 and 42 of the circuit are connected in series with the transmission line 28 over which the information to be displayed is received. In accordance with standard present-day practice, during intervals when no information is being transmitted over the line, terminal 41 will be positive with respect to terminal 42 and a current of approximately 30 milliamperes will be flowing through the line.

Two diodes 43 and 44 are connected to the terminal 41 and are oppositely polarized. Diode 43 is connected to a high frequency transistor oscillator 46 which is capable of operating when supplied with a 30 milliampere current while diode 44 is connected to a second high frequency oscillator 47 which is also capable of operating on a 30 milliampere current. Because the polarities of the diodes 43 and 44, oscillator 46 will be energized during those periods of time when no information is being transmitted over the line and during certain intervals in the course of generation of stock quotation information.

The output of oscillator 46 is connected by way of a capacitor 48 to diodes 49 and 50 connected so as to rectify the output oscillations of oscillator 46 and to apply this rectified signal to one input circuit of a flip-flop 52 which may be, for example, a bistable multivibrator, preferably using transistors or the equivalent as the active elements.

Similarly, the oscillations from oscillator 47 are connected by way of a capacitor 53 to a diode rectifier circuit comprising diodes 54 and 56 which are connected to a second input circuit of the flip-flop 52. At the beginning of each character transmitted along the transmission line, the polarity of the transmission line current is reversed so that oscillator 46 is rendered inoperative and oscillator 47 is rendered operative, thus generating a chain of oscillations which are rectified by the diodes 54 and 56 and applied to the flip-flop 52 to set the flip-flop 52 that is, to reverse its state of conductivity.

One output circuit of the flip-flop 52 is connected both to one input circuit of a flip-flop 57, which may also be a transistorized bistable multivibrator, and to the input terminal 58 of a shift register indicated by reference character 59. The output terminal of the flip-flop 57 is connected to a pulse oscillator 61 to energize it to generate a series of pulses having a repetition rate determined by the standards of the system with which the apparatus is operated. The output of the oscillator 61 is connected to a shift terminal 62 of the shift register 59.

The shift register also has a set terminal 63 and a plurality of serially connected bistable circuits, such as bistable transistorized multivibrators, indicated by blocks, which assume various states of conductivity in accordance with signals applied to the input terminal 58, the shift terminal 62, and the set terminal 63. The first of these bistable circuits is a switching circuit 64. The switching circuit is connected to a first position 66 which is, in turn, connected to a second position 67 and so on through position 69. Position 69, in turn, is connected to an end position 70. Each of these positions, including the switching circuit, is indicated as having a certain initial state of conductivity or a certain initial informational status as indicated by the numbers "0" and "1" in each of the blocks 64–70. Furthermore, each of the positions, except the end position, has one output terminal connected to an input terminal of the next position to the left, and the various positions, including the end position 70, have additional output terminals 71–77 connected as will be described hereinafter. Finally, the switching circuit 64 has a third output terminal 78 which is connected to one of the input terminals of an "and" gate 79. The second input terminal of the gate 79 is connected to the output terminal 77 of the end position 70. The gate 79 connected as described is rendered conductive when the information at the terminals 77 and 78 indicates that there is a "1" at both of these terminals.

A second "and" gate 81 is connected to the output terminals 71 of the switching circuits 64 and 77 of the end position 70 to be rendered conductive when the switching circuit and the end position are in condition such that both have a "1" at the lower point and a "0" at the upper point. Finally, the output terminal 77 of the end position 70 is connected back to another input terminal of the flip-flop 57 to reverse the state of conductivity of the latter and thereby to turn the oscillator 61 off when the state of conductivity of the end position is reversed.

As a result of the foregoing connections, an input signal sufficient to produce in code a certain letter and consisting of a rectangular waveform 82 in FIG. 6a will operate in the following way: At the beginning of the character the polarity of the terminals 41 and 42 will be reversed, as indicated at point 83 and the oscillator 47 will be energized so as to reverse the state of conductivity of the flip-flop 52 until the time indicated by reference character 84. Thereafter, depending upon the code representative of the character, the polarity of the transmission line will again be reversed up to six times during the course of the character. If there is no reversal, it is indicative that the character is a space. If there is one reversal, it may occur at any of the specified intervals of time permitted by the code. In FIG. 6a the code of the particular character illustrated is such that the reversal occurs at a time 84, which means that oscillator 47 is turned off, and oscillator 46 is turned back on, and flip-flop 52 is reversed. However, this does not affect flip-flop 57 which remains in the state to which it is transferred by the initial operation of the flip-flop 52. The polarity of the terminals 41 and 42 may again be reversed or not reversed at any of the other specified intervals of time as determined by the code of the character being transmitted, and in the case illustrated in FIG. 6a the next reversal occurs at the time indicated by reference character 85 which is one unit of time later than the time indicated by reference character 84. Thereafter, for the remainder of the particular character illustrated in FIG. 6a, there are no further reversals.

The output pulses of the oscillator 61 are indicated in FIG. 6c, and, as shown, these pulses are delayed so that they start during the first interval of time when the character code is being presented. They do not start prior to that time, that is, between the times 83 and 84, which is considered to be dead time and merely indicative that the transmission of a character has begun. These are six pulses in each series of oscillations during the course of a character, as indicated by the series of six pulses in FIG. 6c. However, it is only necessary to have five bits of information to create a code for each of the letters in the alphabet and for each of the numerals in the decimal formation to create a code for each of the letters in the number system. The sixth bit of information determines whether the character that has been transmitted by code is a number or a letter. If a letter, the polarity of terminals 41 and 42 returns to the original polarity at the time indicated by reference character 86, but if a number, the terminals 41 and 42 do not return to their original polarity until the time indicated by reference character 87.

The print wheel decoder is shown in greater detail in FIG. 7. The decoding information is conveyed by five rods 91–95. Each of these rods is articulately connected to an arm 97a–101a, respectively, of five code wheels 97–101, and each of these wheels ha san indentation 97b–101b, respectively. The wheels 97–101 are all free rotatable on a shaft 103 and a plurality of spring-loaded rods, of which only one rod 104 is shown, are pushed radially toward the shaft 103 by individual springs similar to spring 105. There are actually 18 of these rods corresponding to a blank position, 10 digits and 7 fractions.

The rods 104 are placed so that one end of each rod is adjacent to a stop disk 106 which is attached to a ratchet wheel 107 and to one of the print wheels 110. This wheel is mounted for rotation on a continuously rotating shaft 108 to which it is connected by means of a slipping clutch 109.

The serrations 97b–101b are arranged corresponding to the code that is used to transmit the information each of the notches will be located adjacent to one of the bars 104, but with the wheels 97–101 in their rest positions, as shown; not all of the serrations will be directly radially beneath the corresponding bar. Instead the notches will be offset slightly, either clockwise or counterclockwise, depending upon the code, so that they will only line up and permit the bar 104 to enter the notches on all of the wheels 97–101 when the proper ones of the rods 91–95 have been actuated. When this happens, the bar 104 can be pressed radially into the aligned notches 97b–101b by the pressure of the spring 105, and this will cause one of the 18 bars spaced around the code wheels to move radially inwardly so that when the stop wheel 106 is permitted to rotate counterclockwise, it will continue to rotate until the stop edge 106a encounters the bar 104 that has been allowed to move radially inward.

The shaft 103 is directly in line with the shaft 108 so that radial movement of the bars 104 with respect to the shaft 103 will also be radial movement with respect to the shaft 108.

The stop wheel 106, being attached rigidly to the rachet wheel 107 is prevented from moving by means of a release arm 111 that engages one of the serrations on the ratchet wheel 107 when the release arm 111 moves down. As indicated by the arrow 112, the release arm is able to move both up and down; and when it moves up, the ratchet wheel is freed and therefore the stop wheel 106 is freed to rotate until the stop wheel engages the next one of the bars 104 that has been moved radially inwardly. As these two wheels rotate, they carry the fractions wheel 110 along with them; and when the stop wheel is halted by having its edge 106a strike one of the bars 104, the corresponding fraction will be placed in printing position, as indicated by the reference numeral 113.

The wheel 110 has an arm 114 attached thereto and extending parallel to the shaft 108. A storage wheel 116 is also arranged on the shaft 108 and is connected thereto by its own slipping clutch (not shown). The storage wheel has a projection 117 lanced out of it in the direction toward the wheel 110 and at the same radial distance from the axis of the shaft 108 as the arm 114.

Information is transmitted from the wheel 110 to the storage wheel 116 when the release arm 111 is moved down in accordance with the second numerical character received over the telegraph line. This frees the wheel 116 to rotate until the projection 117 strikes the arm 114, thereby causing the wheel 116 to assume a position corresponding to position of the wheel 110.

The wheel 116 has an arm 118 extending from it on the other side of the projection 117. This arm 118 extends into the path of motion of a second stop wheel 119 which contains a slipping clutch that allows the stop wheel 119 to be driven by the shaft 108. This stop wheel 119 is connected with a ratchet wheel 121 and a number wheel 122. The stop wheel 119, the ratchet wheel 121, and a number wheel 122 correspond exactly to the stop wheel 106, the ratchet wheel 107, and the number wheel 110 except that, ordinarily, the number wheel 110 will have fractions on its periphery, whereas the number wheel 122 will have whole numbers.

The arm 118 operates the stop wheel 119 in exactly the same way that the arm 104 operates the stop wheel 106. This, when the release arm 112 is moved upwardly to engage one of the ratchet teeth of the storage wheel 116, the second number wheel 122 is released to be rotated by the shaft 108. This rotation continued until the stop edge 119a strikes the arm 118. It will be recalled that the position of the arm 118 was determined by the setting of the arm 114 and the engagement of the projection 117 with the arm 114. Therefore, the second stop wheel 119 causes the second number wheel 122 to stop in a position corresponding to the original position of the number wheel 110. Thus, the positional information is transmitted from the wheel 110 to the wheel 122. In normal operation there will be four such wheels to permit the mechanism to print stock quotations in three whole numbers and a fraction. However, since the transmission of information from the second wheel to the third wheel and from the third wheel to the fourth wheel is identical with the transmission of information from the first wheel 110 to the second wheel 122, there is no reason to repeat the explanation of this procedure.

It will be noted that at the time the release arm 112 moved upwardly to allow information to be transmitted from the storage wheel 116 to the second number wheel 122, the first number wheel 110 is also released to rotated However, by this time the discs 97-101 will have been set to correspond to the second number in the numerical quotation and thus at the time that the wheel 122 assumes a position corresponding to the first number, the wheel 110 will assume a position corresponding to the second number.

Figure 8:
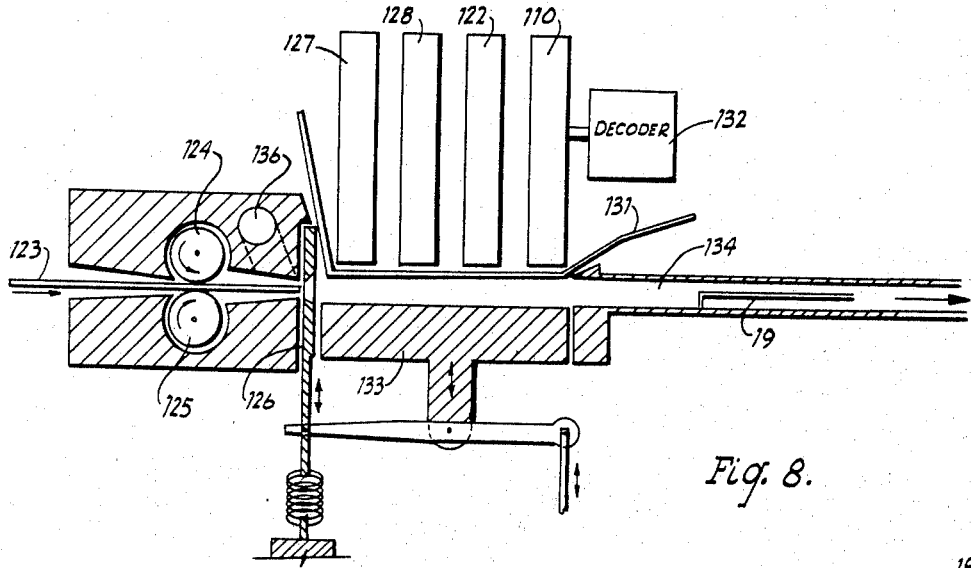
FIG. 8 shows the printing assembly.

The basic elements of the printing unit are shown in FIG. 8. The paper, or cardboard or other suitable material 123 on which the quotations are to be printed and which is to be cut up into short quotation cards, enters the printing mechanism from the left under pressure from two feed rollers 124 and 125. The paper then passes through a guillotine knife structure 126 that cuts off the end of the paper each time a quotation card is printed.

The printing itself is done by four printing wheels, which are the hundreds wheel 127, the tens wheel 128, the units wheel 122, and the fractions wheel 110, pressing against an inked ribbon 131. The decoding mechanism of FIG. 7 is indicated by reference numeral 132.

Attached to the knife 126 and operating therewith is a platen 133 that presses the end of the paper 123 against the ribbon 131 and the latter, in turn, against the printing wheels to print a quotation thereon. At the same time that the quotation is printed, the knife mechanism 126 cuts off the end of the paper and folds the back end over to assist in filling up the pneumatic channel and to provide a form of sail to help drive the quotation card along. A freshly printed quotation card 18 is shown passing through the pneumatic channel 134 after having just been imprinted with a stock quotation. The pressure for driving the quotation card along is provided by air forced through a channel 136 to push the quotation card 18 into the pneumatic channel 134.

The display structure starts with a key 138, one edge 139 of which is coded with slots, or serrations, according to one stock quotation symbol (e.g., IBM, etc.). In accordance with the code used, there must be space for the equivalent of 15 serrations in the edge of the key 5 for each of 3 letters.

The serrated edge 139 faces a stack of vertical bars 141 which are spaced according to the serrations, as will be described hereinafter. Each of the vertical bars has an extension or indentation 142 on the edge away from the key. The bars are divided into pairs, and for each pair one of the extensions 142 is higher on the other bar of the pair.

Behind the bars is a series of fifteen electromagnets 143, each with a coil 144 that can be energized to draw its armature 146 up from a lower position to an upper position. Alternatively, each electromagnet can have a permanently magnetized core, and then the magnetomotive force produced by the coil will have to force the armature 146 down. The lower position corresponds to the lower position of the extension 142 and the upper position corresponds to the upper position of the extension. Therefore, for each pair of bars one or the other will be free to move back toward the corresponding armature 146 either position of the latter. If the armature is in its lower position, the bar that has the higher extension 142 will be free to move back, and conversely if the electromagnet is energized so as to raise the armature to its higher position, the bar with the lower extension will be free to move. All of the armatures 146 pivot on a common axis 147.

All of the bars are initially prevented from moving by a transverse stop 148 which has a cam follower 149 that cooperates with a cam 151 on a main shaft 152 driven by a motor 153 through a slipping clutch 154. To simplify the description, the shaft 152 has been shown broken into widely separated pieces joined by a dot-and-dash line. In actual practice, the separate pieces of the shaft 152 would all be connected together to rotate simultaneously. The cam 151 has a raised area 154 which causes the stop 148 to be held against the bars 141 and thus to prevent the latter from moving under pressure from a spring 156 acting on the serrated key 138. After the proper electromagnets 143 have been energized to raise or lower the armatures 148 to correspond to the encoded information on the serrated edge 139, the cam 151 rotates so that its highdwell area 154 is removed from the follower 149, thus leaving the stop 148 free to move under pressure from the bars 141, which, in turn, move under pressure from the spring 156.

The encoded plate is attached to an interposer rod 157 which extends through and is attached to a yoke 158, the end 158a of which is pressed upon by a spring 159. The rod 157 extends into the vicinity of a flag 161 attached to the main shaft 152 to rotate therewith. If the information applied to the electromagnets 143 does not correspond to the information encoded on to the serrated edge 139 of the key 138, the end of the bar 157 is held away from the path of motion of the flag 161, but if the key 138 has been permitted to move to the left, the bar 157 will be brought into position to be struck by the flag as the shaft 152 causes it to rotate.

The yoke 158 is attached to a vane 162 in one of the display bins. In describing the operation of the vane 162, reference will be made to FIG. 10 as well as to FIG. 9. When the flag 161 strikes the end of the bar 157 and causes the latter to flex, the yoke 158 will be drawn back against the action of the spring 159 and will pull the vane 162 with it. As the vane 162 is pulled by the yoke, its righthand end first strikes the edge of a sawtooth member 163 causing the vane to pivot until it is parallel to one of the sawteeth of the member 163.

Almost immediately the bar 157 springs free of the flag 161 and permits the yoke 158 to move back toward its original position. However, the lefthand edge of the vane 162 catches under the adjacent overhanging lip 164 of the sawtooth member 163 and requires the vane 162 to pivot still farther to what is known as the catching position shown in FIG. 10c, in which it can catch one of the slips 19 on which stock quotation information is printed as the slip is blown along in the direction of the arrow 166. After sufficient time has passed to permit the stock quotation sheet to reach whatever position the vane 162 may occupy on the entire display device 16 of FIG. 1, the sawtooth member 163 is pushed to the left by a cam 167 which is also located on the main shaft 152. This disengages the lefthand edge of the vane 162 from the sawtooth edge 164 under which it was caught and permits the yoke 158 to spring back the remainder of the distance to carry it to its original position shown in FIG. 10a. In this position, the new stock quotation slip 19 will be captured for display.

There is an additional vane 168 mounted on a crank arm which is attached to the sawtooth member 163 to function as an "or" gate. The vane 168 serves to deflect the quotation slip 19 into the proper channel to reach the proper bin in which that is covered by the vane 162. Otherwise, the stock quotation sheet would have to present itself at each of the bins of the entire machine. While the vane 168 is shown as an "or" gate, it will be understood that it is the equivalent of the gates 26 and 27 of FIG. 2.

The shaft 152 is controlled by a cam 169 which has a shoulder 169a that engages a catch 171 to prevent the shaft from rotating except at the proper time. The catch 171 may be operated electromagnetically by means of a pair of electromagnets 172 and 173, of which electromagnet 172 is connected to the "and" gate 81 to draw the catch more firmly into engagement with the cam, while the other electromagnet 173 is connected to the "and" gate 49 to withdraw the catch from contact with the cam 169 and thus to permit the main shaft 152 to rotate under drive from the motor 153. As has been explained, the "and" gate 81 operates as long as additional information is being received to identify the proper bin to receive the next quotation sheet and the gate 79 operates simultaneously with the printer after information has been concluded to designate the proper bin.

While it would be possible to print a quotation slip for every stock quotation, it may be desirable to print only quotations that are to be displayed in the device 16 of FIG. 1. This selection can be carried out by the mechanism associated with a cam 176 on the shaft 152. This cam has a follower 177 which is biased by a spring 178 so that it would normally rest directly on the cam and follow the convolutions thereof. The follower has one or more teeth 179 that operate as a pawl on a ratchet wheel 181 which is connected to the feed rollers 124 and 125. Each time the cam follower 177 moves inwardly toward the shaft 152 and is then pushed back out, a new length of paper is inserted into the printer shown in FIG. 8. In order to prevent this from happening each time the apparatus receives a signal from the telegraph line indicating that the letter symbol has been completed and that the next symbol will be the numbers to be printed, a catch 182 is provided to hold the follower 177 out of the range of contact with the cam 176. This catch engages the printing knife 126, which is shown more completely in FIG. 7, so that each time the printing knife is operated, the catch is released. Otherwise, the catch remains in place and no additional paper is fed into the printer. In this way, quotations of stock that have not been set up by a key 138 shown in FIG. 9 will not be printed and the paper on which these quotations would be printed will be saved.

Figure 9:
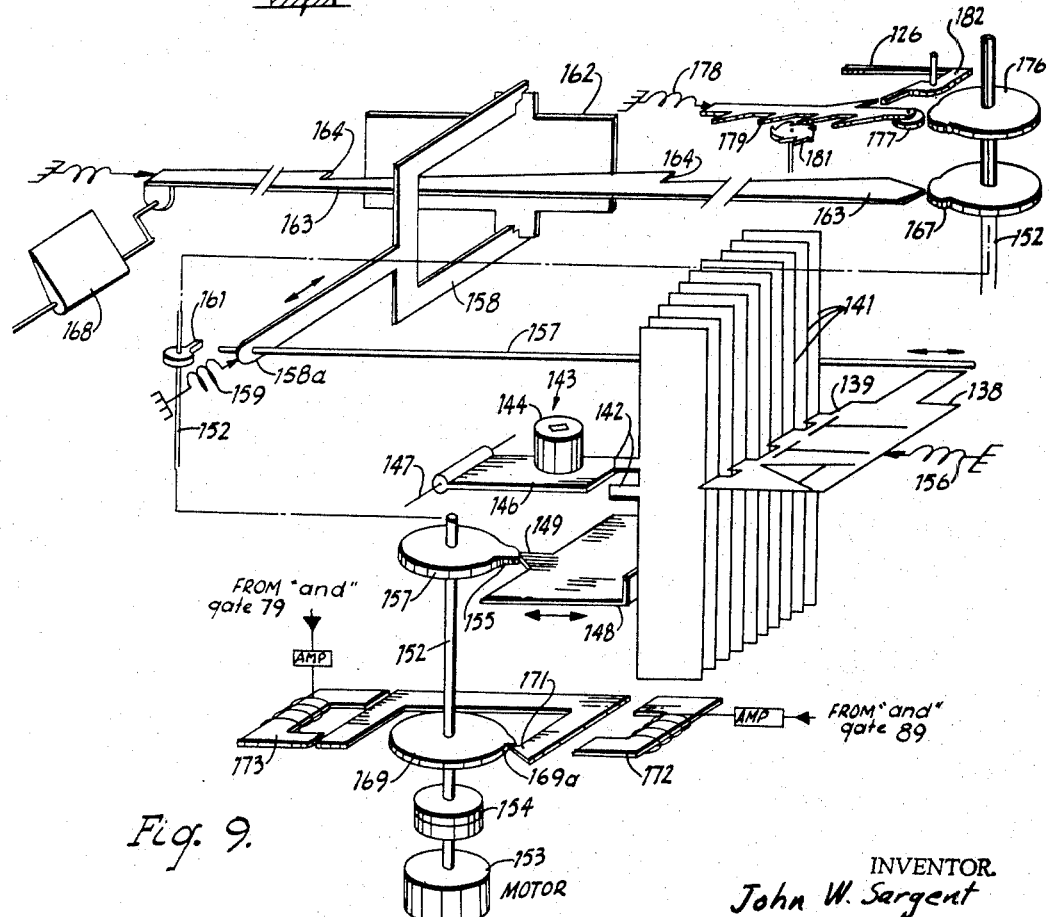
FIG. 9 illustrates the mechanism governing various components, including channel controls for properly distributing quotation cards to display bins.
Figure 10A:
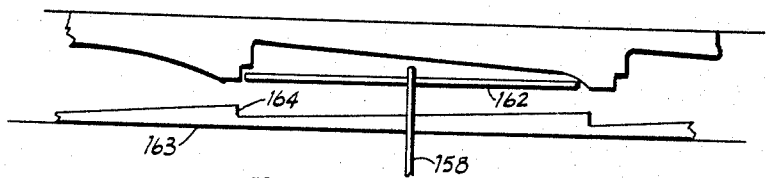
FIGS. 10a–10c show display bin apparatus in various positions for displaying, releasing, and trapping quotation cards.
Figure 10B:
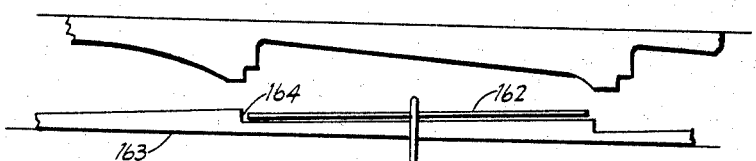
Figure 10C:
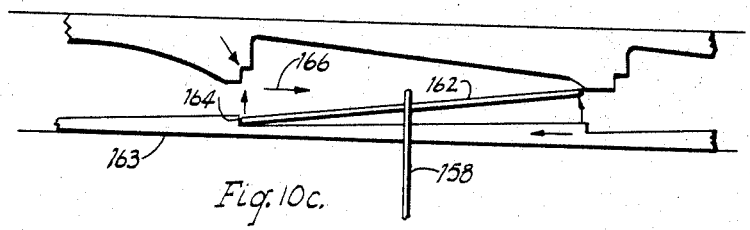
Figure 11:
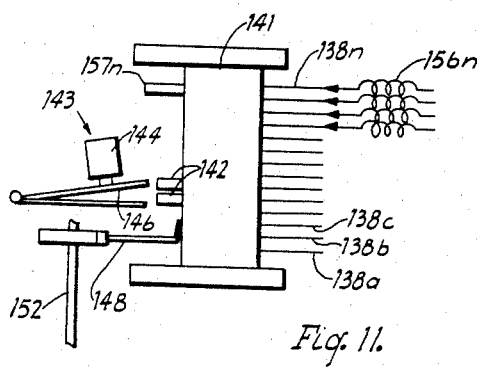
FIG. 11 is a side view of part of the decoding mechanism in FIG. 9.
Figure 12:
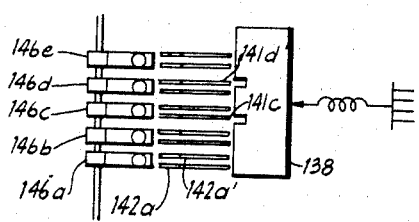
FIG. 12 is a top view of the mechanism in FIG. 11.

FIGS. 11 and 12 show in somewhat greater detail the apparatus by which quotations are screened out for printing and for display. This is a portion of the apparatus shown in FIG. 9. Whereas the apparatus in FIG. 9 shows only a single key 138 corresponding to one stock, FIG. 11 shows a plurality of keys 138a–138n. Each of these keys has its own biasing spring 156a–156n to press it against the bars 141. All of the keys 138a–138n operate the same set of bars 141 and therefore they all operate the same transverse stop 148. However, each of the keys 138a–138n is connected to its own separate rod 157. In order not to obscure the construction, only one of the rods 157 is shown in FIG. 9. In addition, each rod 157 is connected to a particular yoke 158 to operate a particular one of the storage bin vanes 162.

FIG. 11 illustrates some of the armatures 146 in the up position and some of them in the down position.

FIG. 12 shows a top view of the apparatus of FIG. 11, but with only five armatures 146a–146e which is enough to correspond to a single letter. The armature 146a is directly behind two of the extensions 142a and 142a' and the other armatures are similarly located behind corresponding pairs of extensions. It will be observed that the serrated edge 139 of the particular key 138 shown in FIG. 12 has indentations directly opposite the bar 141c and the bar 141d'. Therefore, when the transverse stop 148 shown in FIG. 11 is removed from behind the bars 141, all of the bars will be pushed to the left from the position illustrated in FIG. 12, except the two bars 141c and 141d'. However, they can only be pushed to the left if the armatures 146a–146c are either up or down, as required to avoid being struck by the extensions 142a–142e'. If it is assumed that the armature is properly set, the key 138 can be pushed to the left and the corresponding bin can be opened to release the previous quotation slip, if any, and to await a new quotation slip.

While the foregoing invention has been described in terms of a specific embodiment, it will be understood by those skilled in the art that this embodiment is merely illustrative and is not to be considered as placing any limit on the scope of the invention. The scope is to be determined only by the following claims.

I claim:

1. A stock quotation display device comprising: control means to receive stock quotation signals; a display structure having a plurality of display areas; a pneumatic channel leading to a group of said display areas and connected to said control means to be controlled thereby; printing means connected to said control means to be controlled thereby to print quotations on quotation cards; pneumatic means to cause the printed cards to move through said pneumatic channels; trapping means at each of said areas and connected to said control means to be controlled thereby, said trapping means being operable between at least an open position, in which the previously trapped quotation card is released to be pneumatically removed from said display area to permit a newly printed quotation to be trapped, and a closed position in which the newly trapped quotation card is displayed.

2. A stock quotation display device comprising: control means to receive stock quotation signals; a display structure having a plurality of individual display areas; pneumatic channels leading to groups of said display areas and connected to said control means to be controlled thereby; printing means connected to said control means to be controlled thereby to print quotations on quotation cards for selected stocks; pneumatic means to cause the printed cards to move through said pneumatic channels to a selected group of display areas; trapping means at each of said individual areas and connected to said control means to be controlled thereby, said trapping means being operable between at least an open position, in which the previously trapped quotation card is released to be pneumatically removed from said display area to permit a newly printed quotation card to be trapped, and a closed position in which the newly trapped quotation card is displayed.

3. A stock quotation display device comprising: control means to receive stock quotation signals; a display structure having a plurality of individual display areas; pneumatic channels leading to groups of said display areas and connected to said control means to be controlled thereby; printing means connected to said control means to be controlled thereby to print quotations on quotation cards for selected stocks; pneumatic means to cause the printed cards to move through said pneumatic channels to a selected group of display areas, said control means comprising means for connection to a stock quotation telegraph line to be actuated by signals corresponding to selected stocks; trapping means at each of said individual areas and connected to said control means to be controlled thereby, said trapping means being operable between at least an open position, in which the previously trapped quotation card is released to be pneumatically removed from said display area to permit a newly printed quotation card to be trapped, and a closed position in which the newly trapped quotation card is displayed.

4. A stock quotation display device comprising: a display structure having a plurality of display areas; a pneumatic channel leading to a group of said display areas; printing means to print quotations on quotation cards; pneumatic means to cause the printed cards to move through said channel; separate trapping means at each of said individual areas operable between at least an open position, in which the previously trapped quotation card is released to be pneumatically removed from the respective individual display areas to permit a newly printed quotation card to be trapped, and a closed position in which the newly printed quotation card is displayed; and control means actuated by telegraphic stock quotation information and connected to said printing means to actuate the same upon the occurrence of selected stock symbols and connected to said trapping means to actuate a selective one of said trapping means upon the reception of a corresponding selected stock symbol, said control means also being connected to said pneumatic channel to control movement of said quotation cards therethrough.

5. A stock quotation display device comprising: a display structure having a plurality of display areas; a pneumatic channel leading to a group of said display areas; printing means to print quotations on quotation cards; pneumatic means to cause the printed cards to move through said channel; separate trapping means at each of said individual areas operable between at least an open position, in which the previously trapped quotation card is released to be pneumatically removed from the respective individual display areas to permit a newly printed quotation card to be trapped, and a closed position in which the newly printed quotation card is displayed; and control means actuated by telegraphic stock quotation information and connected to said printing means to actuate the same upon the occurrence of selected stock symbols and connected to said trapping means to actuate selective ones of said trapping means upon the reception of corresponding selected stock symbols, said control means also being connected to said pneumatic channel to control movement of quotation cards through said channel.

6. A stock quotation display device comprising: a display structure having a plurality of display areas, a plurality of pneumatic channels leading to a plurality of groups of said display areas; printing means to print quotations on quotation cards; pneumatic means to cause the printed cards to move through said channels; gating means to limit the passage of said printed cards to one of said channels; separate trapping means at each of said individual areas operable between at least an open position, in which the previously trapped quotation card is released to be pneumatically removed from the respective individual display areas to permit a newly printed quotation card to be trapped, and a closed position in which the newly printed quotation card is displayed; and control means actuated by telegraphic stock quotation information and connected to said printing means to actuate the same upon the occurrence of selected stock symbols and connected to said gating means to select a particular one of said channels and to said trapping means to actuate a selective one of said trapping means upon the reception of a corresponding selected stock symbol.

7. A stock quotation display device comprising: a display structure having a plurality of display areas; a pneumatic channel leading to a group of said display areas; a supply of material on which quotations may be printed; printing means to print quotations on one end of said material; means to feed said end of said material into said printing means; means to sever the printed portion of said material to form a printed quotation card; pneumatic means to cause the printed card to move through said channel; separate trapping means at each of said individual areas operable between at least an open position, in which the previously trapped quotation card is released to be pneumatically removed from the respective individual display areas by said pneumatic means to permit a newly printed quotation card to be trapped, and a closed position in which the newly printed quotation card is displayed; and control means actuated by telegraphic stock quotation information and connected to said printing means to actuate the same upon the occurrence of selected stock symbols and connected to said trapping means to actuate selective ones of said trapping means upon the reception of corresponding selected stock symbols.

8. A stock quotation display device comprising: a display structure having a plurality of transparent display areas; a pneumatic channel leading to a group of said display areas; printing means to print quotations on quotation cards; pneumatic means to cause the printed cards to move through said channel; separate trapping means behind each of said individual areas; each of said trapping means comprising a recess into which a quotation card can fit, a moveable member to hold said card in said recess, and an actuating member connected to said movable member to move the same between at least an open position, in which the previously trapped quotation card is released to be pneumatically removed from the respective individual display areas by said pneumatic means to permit a newly printed quotation card to be trapped, and a closed position, in which the newly printed quotation card is displayed; and control means actuated by telegraphic stock quotation information and connected to said printing means to actuate the same upon the occurrence of selected stock symbols and connected to one of said actuating members to actuate a selective one of said trapping means upon the reception of a corresponding selected stock symbol.

9. A device comprising: control means to receive stock quotation signals; a plurality of display areas; holding means behind each of said display areas to hold a quotation card, each of said holding means having an open position, a catching position, and a closed position; a printer for printing said cards; channel means for channeling said cards from said printer to an appropriate display area; means connected to said holding means to move the same to said open position to permit a previously displayed card to leave said display area; means to return said holding means to the catching position intermediate the open position and the closed position to await reception of a new quotation card, said last-named means comprising a holding bar engaging said holding means; means for withdrawing said holding bar after said card has reached said display area; and means to return said holding means to the closed position.

10. In a device of the character described in claim 9, means for actuating said holding means comprising a source of electric code signals comprising a series of timed impulses; a shift register connected to said source to receive said impulses; means to generate a series of oscillations corresponding in frequency to the basic period of said impulses, said oscillating means being connected to said shift register to shift the same, said shift register comprising a plurality of positions corresponding to the number of bits of information in a character; a counter connected to an input section and an output section of said shift register to count the number of complete characters applied to said shift register, said counter having a plurality of outputs corresponding in number to the maximum number of characters in a complete symbol, said outputs being energized one at a time in regular series; a plurality of electromagnetic coils equal in number to the number of outputs of said counter times the number of active information positions in said shift register, each of said electromagnets being connected to one of the outputs of said counter and one of said information outputs of said shift register to be energized by appropriate relative signals therefrom; means connected to all of said counter outputs to reset said shift register to an initial condition;

and a printer comprising a second plurality of electromagnets equal in number to the number of information positions in said shift register, each of said printer electromagnets being connected to one of said information position outputs to be energized by signals from said shift register; and means connected to input and output sections of said shift register to actuate said printer in response to appropriate corresponding signals from said input and output sections.

References Cited

UNITED STATES PATENTS

| | | |
|---|---|---|
| 2,900,146 | 8/1959 | Hafner et al. |
| 3,091,876 | 6/1963 | Cole. |
| 3,182,796 | 5/1965 | Reed et al. _____ 209—73 |

JOHN W. CALDWELL, *Primary Examiner.*

A. J. KASPER, *Assistant Examiner.*